Sept. 7, 1937.   K. BOLSOE ET AL   2,092,047
DEVICE FOR PROCESSING SOAP
Filed April 2, 1935   3 Sheets-Sheet 1

Inventors
Knute Bolsoe
Harry Stone
By Cox & Moore attys.

Sept. 7, 1937.  K. BOLSOE ET AL  2,092,047
DEVICE FOR PROCESSING SOAP
Filed April 2, 1935   3 Sheets-Sheet 2
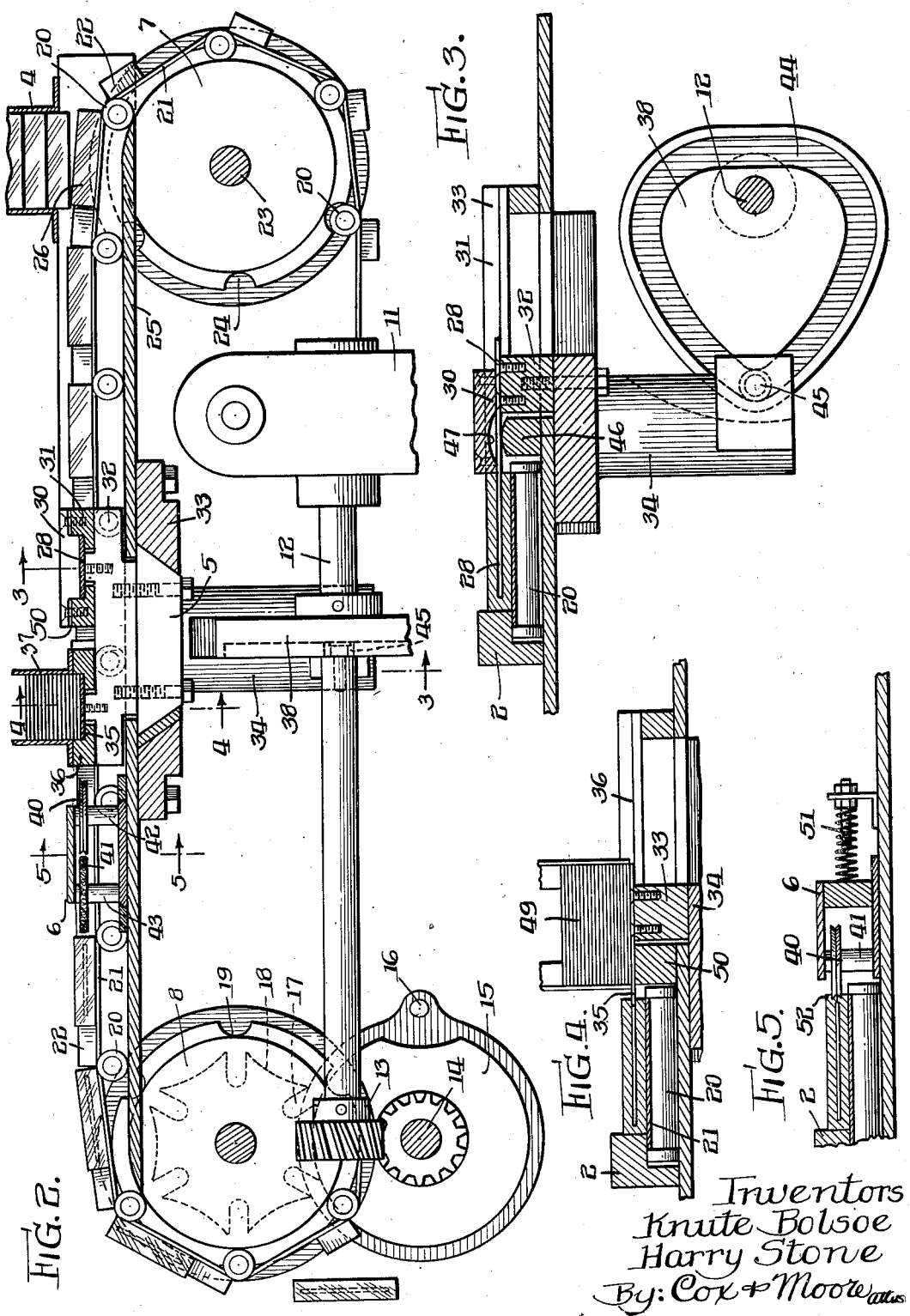
Inventors
Knute Bolsoe
Harry Stone
By: Cox + Moore attys

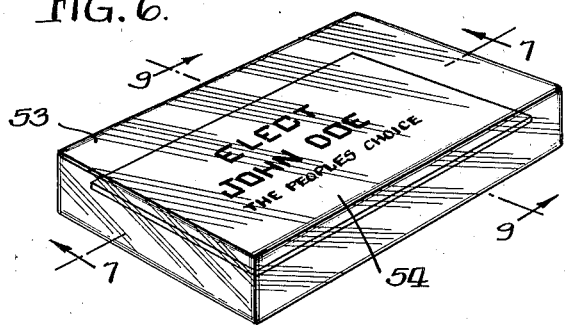
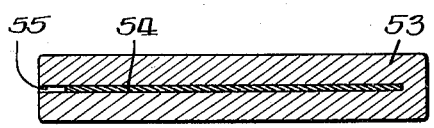
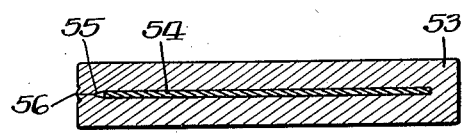
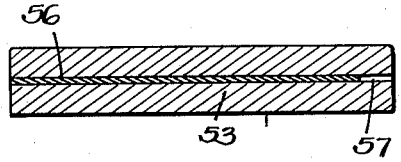
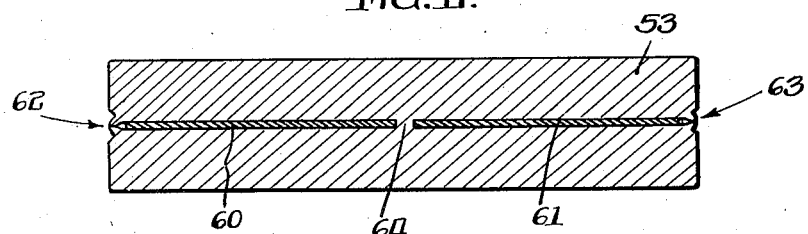

Patented Sept. 7, 1937

2,092,047

UNITED STATES PATENT OFFICE 2,092,047

DEVICE FOR PROCESSING SOAP

Knute Bolsoe and Harry Stone, Chicago, Ill.; said Bolsoe assignor to Maurice B. Sawyer, Chicago, Ill.

Application April 2, 1935, Serial No. 14,291

12 Claims. (Cl. 25—7)

This invention relates to a cake of soap and a method of manufacturing the same. More particularly this invention relates to a cake of soap and method of manufacturing the same, said cake of soap being made of transparent soap substance and having internally sealed therein a card or other foreign substance which card or other foreign substance may, for instance, have visible advertising matter printed thereon.

It is an object of this invention to provide a cake of soap and means for manufacturing the same having completely sealed therein a foreign material.

It is another object of this invention to provide a cake of soap and means for manufacturing the same having completely sealed therein a card.

It is another object of this invention to provide a cake of soap and method of manufacturing the same, said cake of soap having integrally incorporated therewith a card containing advertising matter.

It is another object of this invention to provide a transparent cake of soap having internally sealed therein a card containing advertising matter.

It is another object of this invention to provide means for forming a cavity inside a cake of soap after the cake of soap has been formed.

It is another object of this invention to provide means for inserting a substance into a cavity formed within a cake of soap after the cake of soap itself has been formed.

It is another object of this invention to provide means for forming a cavity internally within a cake of soap, inserting a solid substance into said cavity and sealing up the cavity whereby to form a cake of soap having integrally incorporated therein a foreign substance.

Numerous other objects and advantages will be apparent throughout the progress of the following specification.

Figure 2 is a cross sectional view of the embodiment shown in Figure 1 along the line 2—2 of Figure 1.

Figure 3 is a cross section of the embodiment shown in Figures 1 and 2 about the line 3—3 of Figure 2.

Figure 4 is a partial cross section of the embodiment shown in Figure 2 about the line 4—4 of Figure 2.

Figure 5 is a partial cross section of the embodiment shown in Figure 2 about the line 5—5.

Figure 6 is a perspective view of the article of manufacture embodying the invention disclosed herein.

Figure 7 is a cross sectional view of Figure 6 about the line 7—7 showing the unsealed cavity in the cake of soap.

Figure 8 is a cross section of the soap also about the line 7—7 of Figure 6 showing the appearance of the cavity when sealed.

Figure 9 is a cross section of Figure 6 about line 9—9 of Figure 6.

Figure 10 is a cross section of another embodiment of the soap shown in Figure 6 showing a somewhat different method of forming the cavity in the soap.

Figure 11 is also a cross section of another embodiment of the soap shown in Figure 6 also showing another method of making the cavity in the soap.

Figure 1:
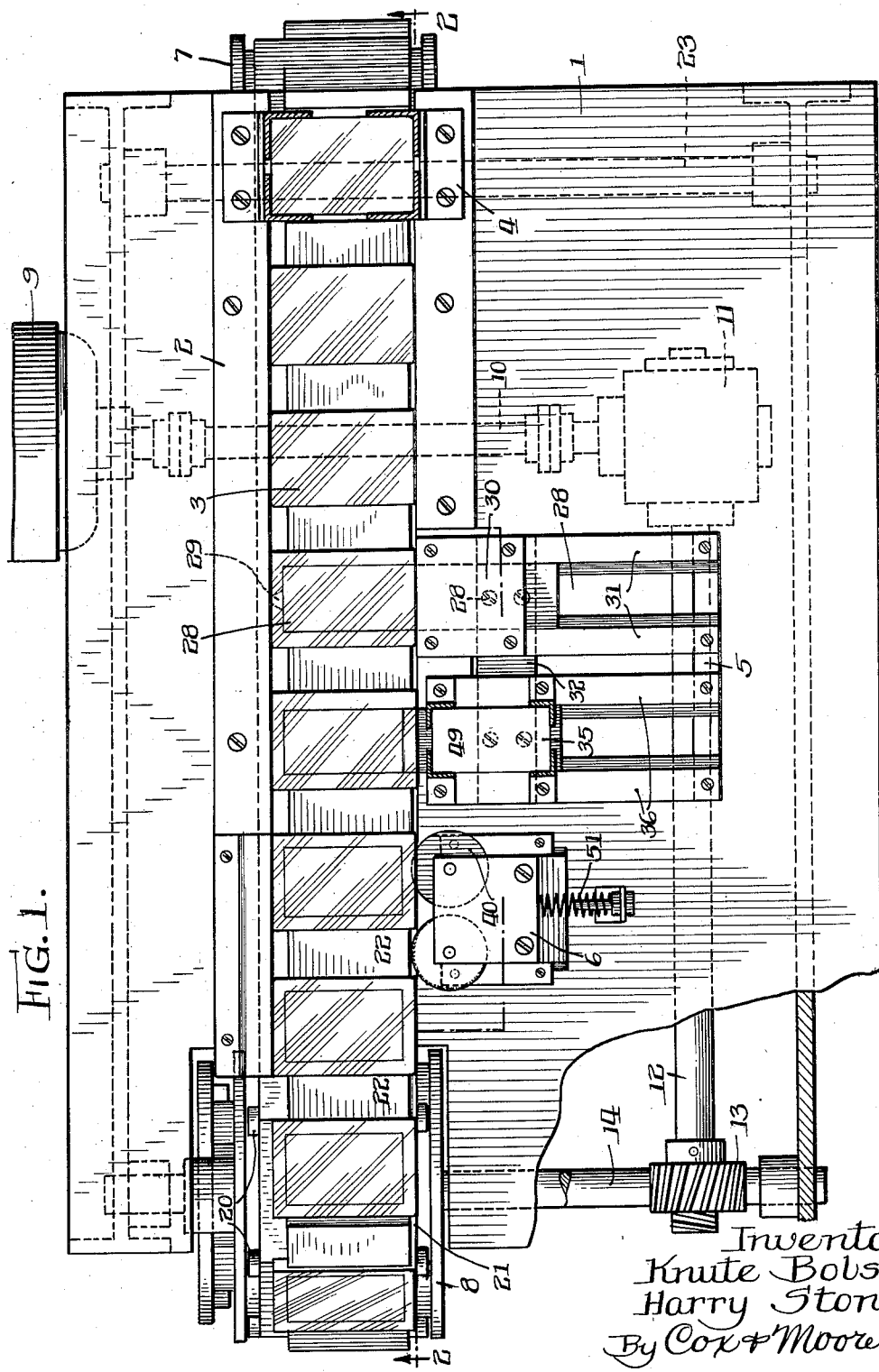
Figure 1 is a plan view of a preferred embodiment of the machine for manufacturing the soap.

In general this invention comprises the forming of a long flat rectangular cavity preferably in the very center of the cake of soap and extending outwardly, opening along one edge of the cake of soap by incising said cavity in the soap with a suitably arranged blade or knife and then subsequently inserting in the cavity thus formed a card or other suitable substance and then sealing the cavity of the soap along the outside where the cavity opens onto an edge or face of the soap. It is preferable to use a cake of soap of the transparent or so-called "glycerine" type. Furthermore, it is preferable to subject this soap to the process described herein shortly after it has been formed. In the manufacture of soap, after saponification has been completed and the bars molded and cut into cakes, a curing process begins during which the cake loses some of its moisture content. At the beginning of this so-called "curing" period, a cake of soap, and more particularly, transparent or so-called "glycerine" soap is somewhat plastic and non-brittle. As the soap grows older it loses this somewhat plastic character and becomes rather brittle. It is because of this that it is desirable, as mentioned above, to process the soap in accordance with the present invention, before the soap has become substantially "cured" or in other words, before the soap has lost its somewhat plastic character and has become correspondingly brittle.

The embodiment shown in Figure 1 comprises a table-like frame structure 1 along the top surface of which is mounted a conveyor track 2. In the conveyor track runs a conveyor mechanism 3. On the conveyor track 2, preferably at one end thereof, is mounted a magazine 4. Along one side of the conveyor track, preferably midway of its length, is located the insertion means 5. Further along the conveyor track in the direction of conveyor motion is located the sealing mechanism 6. The conveyor 3 runs on an idler support 7 located at the forward end of the conveyor track preferably beneath the soap magazine. The conveyor 3 is also mounted at the opposite end of the conveyor track upon a conveyor driving mechanism 8. The conveyor driving mechanism 8 is operated by the electric motor 9 which turns the shaft 10. The shaft 10 is connected to a conventional power reduction gearing device 11. The power reduction gearing device 11 in turn rotates the shaft 12 which turns the worm gear arrangement 13. The worm gear arrangement 13 in turn rotates the shaft 14 which operates the conveyor driving mechanism 8.

Referring to Figure 2, it will be seen that this conveyor driving mechanism 8 is constructed somewhat along the lines of a conventional Geneva movement. The shaft 14 rotates the driving wheel 15 of the mechanism. This drive wheel has an extension drive pin 16 which is designed to cooperate with the slots 17 of the driving mechanism 8. Furthermore, the surface of the driving wheel 15 is designed to cooperate with the surfaces 18 of the Geneva cam so that during the greater portion of each rotation of the drive wheel 15, the Geneva cam is locked in the position to which it was rotated by the intermeshing of the extension drive pin 16 with one of the slots 17 of the Geneva cam. The Geneva cam is integrally formed with a wheel of larger circumference to complete the conveyor driving mechanism 8. This portion of larger circumference has formed along its circumferential surface an appropriate number of circular recesses 19. The circular recesses 19 are adapted to fit into the sliding support members 20 of the conveyor, whereby to form a sort of sprocket-like driving and supporting action for the conveyor. It may be observed that in the Geneva cam shown there are six slots. Thus it will be seen that as the extension driving pin 16 of the drive wheel 15 enters one of the slots 17, the Geneva cam will be moved through an angle of 60 degrees whereupon the drive pin leaves the slot and the surface 18 of the Geneva cam rides along the top surface of the driving wheel whereby the Geneva cam is locked in this position until the extension pin 16 comes around on the next rotation and enters the next succeeding slot in the Geneva cam. This imparts a sort of "stop and go" movement to the conveyor 3. The driving mechanism is so designed that during each successive stop and go movement of the conveyor, the conveyor will have moved forward by the distance of one link of the conveyor. That is to say, the distance between the centers of two successive sliding support members.

The conveyor comprises a plurality of sliding members 20 on which are hingedly mounted a plurality of flat metal conveyor plates 21. On each of the conveyor plates 21 is mounted a long rectangular block 22 which extends substantially across the width of said conveyor plate. This block 22 serves to hold the respective cakes of soap rigidly on the conveyor and also to propel the respective cakes of soap along with the conveyor. The conveyor travels around the driving mechanism 8 and passes backward along the underside of the table top 1 of the machine around the idler support member 7. This idler support member runs on the idler shaft 23 and is formed with an appropriate number of circular recesses 24 disposed around its circumferential surface. The circular recesses 24 are designed to fit the sliding conveyor supports 20 in a manner similar to that described in connection with the recesses 19 on the driving mechanism 8. This forms a sort of sprocket-like idler supporting member around which the conveyor passes. The conveyor passes around the idler supporting mechanism 7. The sliding conveyor support members 20 slide up onto the track member 25 which is the bottom side portion of the track member 2. In passing onto the track, the conveyor passes beneath the soap magazine 4. The bar of soap 26 in the soap magazine drops down onto the conveyor plate 21 and is carried forward from beneath the magazine. Meanwhile, the block 22, which is mounted on the next succeeding conveyor plate, moves up into position behind the bar of soap propelling the same forwardly from beneath the magazine along with the movement of the conveyor. Meanwhile, the top surface of this block 22 slides along the bottom surface of the next bar of soap in the magazine and maintains that bar of soap in the magazine until the block 22 has passed beyond the forward edge of the magazine whereupon the next bar of soap drops down onto the next succeeding conveyor plate 21 and is held on the conveyor and propelled along in the manner described above.

The bar of soap is carried forward along the conveyor in intermittent movements as above described, moving forward at each interval a distance equal to the length between the centers of two successive sliding support members of the conveyor. The inserting mechanism 5 is disposed along one side of the conveyor track about midway of its length at such a point that each individual bar of soap makes two successive stops in traveling by the inserting mechanism 5. The inserting mechanism 5 consists of a long flat inserting blade 28. This inserting blade is substantially square along its forward leading edge. However, in treating certain soaps, it may be desirable to form this blade with a small point-like extension 29 along the leading edge. The blade is held in place by a retaining cover 30 and moves within a pair of parallel slide members 31. The slide members 31 extend outwardly from the conveyor track at right angles thereto. The blade is rigidly fixed to a cross member 32. The cross member 32 is machined along the lower portion thereof so as to be slidingly retained within the dovetail slide 33. The cross member is rigidly fixed to a slotted driving post 34. The inserting mechanism also contains a sliding inserter blade 35 which operates within a pair of parallel slide members. The parallel slide members 36 are arranged adjacent to the parallel slide members 31 and similarly extend outwardly from the conveyor track at right angles thereto. Along the forward portion of the slide members 36 is superposed a card-containing magazine 37. The inserter blade 35 is also rigidly mounted to the cross member 32. The driving post 34 cooperates with a heart-shaped cam 38 which is mounted on the power shaft 12. This heart-shaped cam, in the course of its rotation, moves the driving post 34 and with it the cross member and the two blades mounted thereon forward and backward with an interrupted motion such that the blades are driven forward, retracted and then held at rest in the retracted position during the balance of each rotation of the heart-shaped cam.

This cam is set at such an angle on the driving shaft 12 that it is co-ordinated with the Geneva movement whereby during each forward movement of the conveyor, the blades are at rest in the retracted position, and during each stop in the conveyor movement the blades are moved forward and retracted.

It is obvious, therefore, that the soap is carried forward on the conveyor by intermittent forward movements and is brought to rest in front of the blade 28 of the inserting mechanism. The machine is adjusted so that as the soap stops in front of the blade 28, the raised portion of the track 2 holds the bar against the blade 28, the center line of the soap corresponding with the center line of the blade. As the forward motion of the soap stops, the blade 28 moves forward into the soap a predetermined distance and is retracted, leaving within the soap a long, narrow, centrally disposed cavity. Just as the blade 28 is fully retracted and brought to rest during the quiescent portion of its cycle, the conveyor moves one step further forward and comes to rest directly in front of the inserter blade in such a manner that the central axis of the cavity made in the soap corresponds exactly with the center line of the inserter blade. The inserter blade, having been drawn to its rearmost position during the retractive movement of the heart-shaped cam, has passed backward from beneath the card-containing magazine 37 so that the bottom card contained therein drops down in front of the forward edge of the inserter blade 35. As the soap comes to rest in front of the inserter blade, the inserter blade again begins its forward motion, pushing in front of it the card from the card magazine which has dropped down into place, thus shoving this card into the cavity in the soap and then being withdrawn. Meanwhile, the inserter blade has been driven forward and has made a cavity in the next succeeding bar of soap. As the retractive movement is completed and the inserter mechanism again comes to rest during the quiescent portion of the cycle of the heart-shaped cam, the conveyor again moves the soap forward one step. This step by step forward motion continues, carrying the soap past the sealing device 6. The sealing device 6 preferably comprises two successively disposed small wheels 40 and 41 mounted on the proper axles 42 and 43 respectively. The sealing wheel 40 has a V-shaped slot in its crown which bites into the soap and crimps down the outer exposed edges of the cavity made in the soap by the blade 28. The wheel 41 contacts these crimped edges and by a sort of smearing action smooths over and completely seals the cavity. This wheel 41 may have a flat face or may have a felt-covered surface.

In processing certain kinds of soap it has been found desirable to provide a wick means at the rear of the sealing device. The wick means, under such circumstance, would cooperate with the felt-covering on the wheel 41 to saturate that felt-covering with a liquid, preferably water, to further aid in the complete sealing of the cavity in the soap. The finished soap is then carried along the conveyor to the end thereof. As the conveyor passes around the driving mechanism 8, the soap drops off into a suitable receiving basket.

Referring to Figure 3, it will be seen that the heart-shaped cam has a slot 44 therein. A roller bearing is mounted in the driving post 34 and is adapted to ride within the slot 44 so that the post 34 is positively driven by the heart-shaped cam 38. The cutting blade 28 is held within the parallel slides 32 by the retaining cover 30 and is supported from beneath at the forward portion thereof by the bottom supporting member 46. The retaining cover 30 is under-cut to form an upwardly extending hollow 47 above the blade 28. The top of the bottom supporting member 46 is relieved to form a complementarily curved top surface. The retaining cover 30 is so designed that it does not fit tightly down upon the slide members 32, but instead leaves a small space as shown at 50 in Figure 2 between itself and the slide members 31. Thus, the forward mounting screws of the retaining cover 30 may be screwed down more or less tightly than the rearward mounting screws on the retaining cover 30 whereby the blade 28 may be deflected upward or downward whereby to control its cutting action in the soap. If the deflection of the blade is not properly controlled, the blade will tend to cut a cavity which is not parallel to the bottom and cross surfaces of the soap.

Referring to Figure 4, it will be seen that the card-inserter blade 35 will be moved back in retractive motion where the forward edge is beyond the rearward edge of the card magazine, whereupon a card will drop downward in place in the slide in front of the forward edge of the inserter blade 35. As the inserter blade moves forward, the soap will be arranged exactly in front of the blade so that the card will be pushed forward directly into the cavity therein. The length of the card and the length of the cavity may be so arranged that the forward edge of the card comes to rest exactly at the forward extremity of the cavity. The inserting blade will obviously penetrate the outside portion of the cavity somewhat in placing the card therein.

Referring to Figure 5, it may be seen that the sealing device 6 is mounted on a sliding bracket which is urged forward into contact with the soap by means of the spring 51. The V-shaped sealing wheel bites into the edge of the soap crimping the edges of the cavity closed at 52. The condition of this sealed cavity is more clearly shown in the cross section in Figure 8.

In operation, the soap containing magazine 4 is filled with soap and the conveyor started. The bars of soap are successively carried past the cutting blade, a cavity is made therein, then the soap is carried past the card-inserting blade and a card inserted therein. Finally the cavity is sealed, as above described, and the soap is ready for use. One preferred form of the finished product is shown in Figure 6 which consists of a bar of transparent soap 54 with a card containing visible advertising matter thereon. This card 54 is completely and integrally sealed within the soap. Figure 7 shows the card 54 in place in the cavity prior to sealing. There is a small portion of the cavity 55 which remains unfilled and extends to the outer face of the soap. The cavity is sealed by crimping the edges of this unfilled space 55, as shown at 56 in Figure 8.

If it is desirable to process a soap while it is comparatively soft and gelatinous, it has been found that a vacuum is created in the cavity as the cutting blade is withdrawn. Since the soap is very soft, the pressure of the atmosphere on the top surface of the soap will tend to force the cavity closed against the vacuum as the knife is withdrawn. When this condition prevails, it has been found desirable to make the cutting blade 28 with a small centrally disposed point as shown by the dotted lines at 29 in Figure 1. This pointed extension passes completely through the soap and punctures the opposite face, leaving a small duct leading into the cavity from the opposite face as shown at 57 in Figure 10, so that as the knife is withdrawn, air will rush into the cavity, preventing the formation of a vacuum and thereby overcoming the phenomenon above described. Ordinarily, however, the soap may be processed while it is of a sufficiently stiff consistency so that this difficulty is not encountered. Various forms of soap may be made by this process, for instance, it has been found that by inserting a card into the center portion of a bar of soap, as above described, the soap may be used more completely, that is to say, ordinarily when a bar of soap, by reason of use, becomes very thin and small, it tends to crack and crumble. When the card is in place in a bar of soap, however, this crumbling effect is overcome and the soap may be consumed completely. Thus, it is very satisfactory to process a bar of non-transparent soap in the manner above described, inserting a small piece of unprinted cardboard or even a small piece of wood or metal whereby to render the soap completely usable and overcome the disadvantages encountered by reason of the crumbling action above described. Furthermore, it is possible to make a floating soap out of heavier-than-water soaps by cutting a somewhat larger cavity therein and inserting a very light piece of wood, such as balsa wood.

It is also possible to arrange a series of cutting blades and inserting blades in tandem so that a large molded bar of soap may have a plurality of insertions made therein prior to being subdivided into smaller cakes of soap. In such an instance the large bar of soap with a series of parallel insertions therein would be cut into smaller bars by a knife which passes through the soap parallel to and midway between the individual insertions.

By various changes in the arrangement of the parts, it is possible to make different types of cavities in the soap to accommodate different types of insertions. For instance, by using a pair of inserting devices arranged on opposite sides of the conveyor, it is possible to make two opposite cavities in the soap and insert two separate cards respectively therein to form an article shown in cross section in Figure 11. Such a bar of soap 53 would have two cavities therein 60 and 61 respectively sealed at the outer edges thereof 62 and 63 respectively with a separating wall of soap 64 centrally located therebetween.

Changes may be made in the form, construction, and arrangement of the parts without departing from the spirit of the invention or sacrificing any of its advantages, and the right is hereby reserved to make all such changes as fairly fall within the scope of the following claims.

The invention is hereby claimed as follows:

1. In a device of the character described, card-inserting means comprising a cross bar member, a plurality of blades mounted in tandem along the cross bar member, driving means connected to the cross bar member, heart-shaped cam means cooperating with said driving means positively cooperating with said driving means whereby to move the blades successively forward to retract the blades and then hold the blades in retracted position for a predetermined time during each rotation of the heart-shaped cam.

2. In a device of the character described, card-inserting means comprising a cross member, dovetail slide means in which said cross member is slidingly supported, a plurality of blades rigidly connected in tandem to said cross member and extending out therefrom at right angles thereto, a plurality of slide means supporting said blades, one of said blades being longer than another of said blades.

3. In a device of the character described, cavity sealing means comprising a member having a wedge-shaped edge adapted to penetrate to a predetermined distance into the face of the soap having the cavity opening thereon.

4. In a device of the character described, cavity sealing means comprising a member having a plurality of surfaces of wedge-shaped cross section, one of said wedge-shaped surfaces penetrating at a point above the edge of the cavity in the soap and another of said surfaces penetrating at a point below an edge of the cavity in the soap.

5. In a device for sealing a cavity in a bar of soap, conveyor means, means cooperating with said conveyor means for holding rigidly thereon the soap to be sealed, wheel means disposed at one side of the conveyor means, said wheel means rotating in a plane parallel to the plane of the conveyor, said wheel being capable of penetrating the adjacent surface of the soap.

6. In a device for sealing a cavity in a bar of soap, conveyor means, means cooperating with said conveyor means for holding rigidly thereon the soap to be sealed, wheel means disposed at one side of the conveyor means, said wheel means rotating in a plane parallel to the plane of the conveyor, said wheel having an internally directed V-shaped crown, the forward edges of said crown being capable of penetrating to a small distance the adjacent face of the soap around the opening of the cavity therein.

7. In a device for processing soap, means for conveying soap in step movement, blade means for forming a cavity within the soap, means for inserting a substance into said cavity, driving means for said conveyor adapted to impart step motion to said conveyor, a unitary driving means for the cavity forming means and card inserting means, said last named means being operated by a heart-shaped cam rotating upon the same shaft and synchronized with the conveyor driving means.

8. In a device of the character described, synchronizing means comprising a rotatable drive shaft, heart-shaped cam means mounted rigidly on said rotatable drive shaft, gear means also mounted on said drive shaft, power transmitting means connected to said gear means, said power transmitting means being adapted to transmit step motion, said gear means and said heart-shaped cam means being arranged on said driving shaft means with respect to each other so that the heart-shaped cam means is passing through a motion transmitting cycle only during the non-motion imparting intervals of the power transmitting means.

9. A machine for processing soap comprising magazine means for containing a plurality of cakes of soap, conveyer means disposed for straight line movement beneath the magazine means, means co-operating with the conveyer means for abstracting one bar of soap at a time from the magazine means, cutting blade means for forming a cavity in the soap, card-inserting means for disposing a card in the cavity, and driving means for simultaneously actuating the conveyer means, the cutting blade means, and the card-inserting means in a predetermined timed relationship.

10. A machine for processing soap comprising magazine means for containing a plurality of cakes of soap, conveyer means disposed for straight line movement beneath the magazine means, means co-operating with the conveyer means for abstracting one bar of soap at a time from the magazine means, cutting blade means for forming a cavity in the soap, card-inserting means for disposing a card in the cavity, said cutting blade means and card-inserting means being disposed at laterally spaced stations along the conveyer means, and driving means for simultaneously actuating the conveyer means, the cutting blade means, and the card-inserting means in a predetermined timed relationship.

11. In a device for processing soap, magazine means for holding a plurality of cakes of soap, conveyer means disposed for straight line movement beneath the magazine means, means for co-operating with the conveyer means for abstracting one bar of soap at a time from the magazine means, driving means co-operating with the conveyer for moving the conveyer intermittently forward, card-inserting means disposed along the path of the conveyer and operating substantially in the same plane therewith but at right angles to the line of motion thereof, said card-inserting means being driven in co-ordination with the conveyer driving means in such a way that the inserting operation thereof is performed intermittently during the periods when the conveyer is at rest.

12. A machine for processing soap comprising magazines means for containing a plurality of cakes of soap, conveyer means, means co-operating with the conveyer means for abstracting one bar of soap at a time from the magazine means, cutting blade means for forming a cavity in the soap, card-inserting means for disposing a card in the cavity, and driving means for simultaneously actuating the conveyer means, the cutting blade means, and the card-inserting means in a predetermined timed relationship.

KNUTE BOLSOE.
HARRY STONE.